Figure 1:
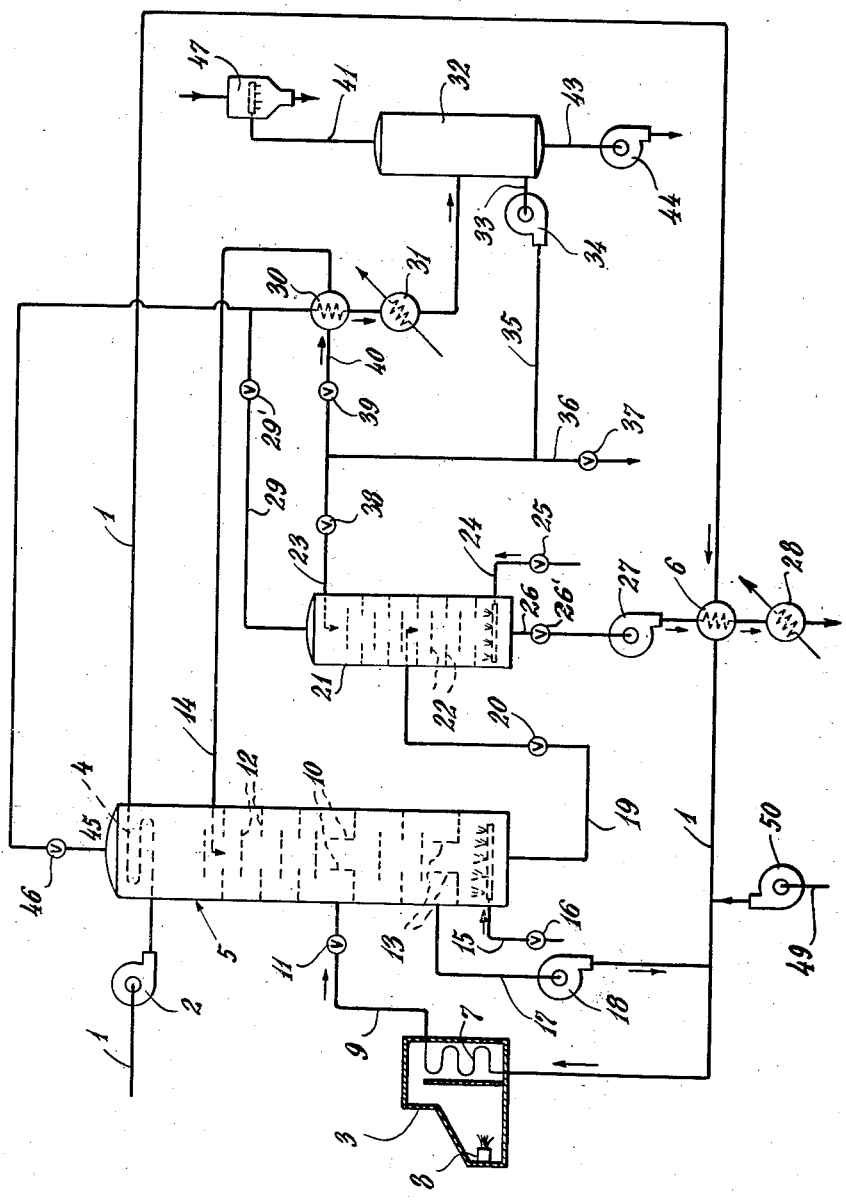

Feb. 16, 1943.  R. F. RUTHRUFF  2,310,997
THERMAL TREATMENT OF DRYING OILS
Filed Aug. 26, 1939

INVENTOR

Patented Feb. 16, 1943

2,310,997

UNITED STATES PATENT OFFICE 2,310,997

THERMAL TREATMENT OF DRYING OILS

Robert F. Ruthruff, Nutley, N. J.

Application August 26, 1939, Serial No. 292,008

3 Claims. (Cl. 106—252)

This invention relates to improved methods for the thermal treatment of drying oils or mixtures containing drying oils.

The thermal treatment of drying oils or mixtures containing drying oils is well known in the art. For example, lithographic varnishes are made by heating raw linseed oil or refined linseed oil to elevated temperatures in the absence of air. During this thermal treatment a partial polymerization and/or condensation of the drying oil occurs, the resulting product being much thicker than the original charge. By varying the temperature of treatment or the time of treatment or both, the extent of reaction changes and lithographic varnishes of differing consistencies are obtained. Similarly, thermal treatment is involved in the preparation of oleoresinous varnishes. In the preparation of these materials the first step usually consists in "running" the desired resin or gum or mixture thereof, following which the heated drying oil, which may be either a raw drying oil, a refined drying oil, a blown drying oil, a boiled drying oil, a drying oil that has been partially polymerized and/or condensed, or mixtures thereof, is added. The resulting mixture is then thermally treated. If an unboiled drying oil is used in the preparation of such oleoresinous varnishes, a drier or driers are usually added during the thermal treatment, preferably near the end thereof. Similarly, raw drying oil or refined drying oil is thermally treated in the presence of a drier or driers such as linoleate, resinate, or the like of such metals as cobalt, lead, or manganese to produce the so-called boiled drying oils. Other thermal treating processes are utilized to a greater or lesser extent, for example, heating of drying oil in the presence of air to produce blown oils, heating to produce broken oils, et cetera, but the processes already considered briefly are sufficient to outline the general aspects of the thermal treatment of drying oils and to indicate the importance of the operation.

Whenever the following terms are used in the instant description or claims, they conform to the respective definitions shown.

*Raw drying oil.*—A siccative oil that has been subjected to no processing procedure except perhaps clarification.

*Refined drying oil.*—A siccative oil that has been acid or alkali treated or subjected to any treating procedure to improve appearance or properties. As used in the instant specification, the term includes "broken" oils, that is, oils that have been heated to an elevated temperature to decompose mucilage and similar materials and then clarified.

*Blown drying oil.*—A siccative oil that has been contacted with air at superatmospheric temperature.

*Boiled drying oil.*—A siccative oil that has a drier or driers incorporated therein.

*Lithographic varnish.*—A siccative oil that has been heated in the substantial absence of air to cause partial polymerization and/or condensation thereof.

*Running.*—The process of treating gums, resins, or mixtures thereof prior to adding to a drying oil or mixture of drying oils for the production of oleoresinous varnishes, said treatment facilitating the incorporation of the gums, resins, or mixtures thereof in the siccative oil. Usually running involves melting of the gums, resins, or mixtures thereof, the operation being accompanied by more or less distillation and thermal decomposition of the charge.

The thermal treatment processes of the prior art have been conducted in a most inefficient manner. The processes have been operated batchwise, the thermal treatment being carried out in kettles placed over an open fire. It is evident that under such conditions control of temperature is very difficult and utilization of heat is quite inefficient. Furthermore, it is impossible to avoid contamination of the product by extraneous materials, and in the event that it is desired to conduct the thermal treatment in the absence of air this is difficult or impossible to achieve when following the practices of the prior art. In short, the practices of the prior art in the thermal treatment of drying oils or mixtures containing drying oils exhibit most or all of the many disadvantages of batch type operations, such as non-uniform products, high labor costs, inefficient utilization of utilities and equipment, et cetera.

It is an object of this invention to provide improved methods for the thermal treatment of drying oils or mixtures containing drying oils. A further object of this invention is to provide methods for the continuous thermal treatment of drying oils or mixtures containing drying oils. Another object of this invention is to provide methods for the thermal treatment of drying oils or mixtures containing drying oils whereby products of uniform quality are produced. An additional object of this invention is to provide methods for the efficient utilization of heat in the thermal treatment of drying oils or mixtures containing drying oils. Other objects of this invention will become evident from the following description.

Briefly, one embodiment of the instant invention for the thermal treatment of drying oils or mixtures containing drying oils consists of continuously passing drying oils or mixtures containing drying oils through one or more heating zones, transferring the thus heated charge to a combined fractionating and reaction zone, removing a portion of the liquid products from said combined fractionating and reaction zone for passage to the previously mentioned heating zone or zones, passing the remainder of the liquid products from said combined fractionating and reaction zone to a secondary combined fractionating and reaction zone preferably operating at a lower pressure than the primary combined fractionating and reaction zone, and removing the liquid products, comprising thermally treated product, from said secondary combined fractionating and reaction zone.

In the instant specification, the terms primary and secondary as applied to the combined fractionating and reaction zones bear no relationship to the relative importance of the elements to which the terms are applied. These terms are used for purposes of identification only and serve to fix the relative position of the elements in the whole combination.

For the more complete understanding of this invention reference is made to the following specific description, to be read in connection with the accompanying figure forming a part of the instant specification and wherein the figure is a diagrammatic representation of one form of a suitable apparatus for the thermal treatment of drying oils or mixtures containing drying oils in accord with this invention.

Raw or refined linseed oil enters the system through line 1 and is moved by pump 2 to furnace 3. Between pump 2 and furnace 3 the charge is preferably passed through one or more heat exchangers, such as for example coil 4 in the top of tower 5 and indirect heat exchanger 6. The furnace 3 preferably consists of a pipe still of any suitable form, many of which have been described in the art. The charge passes therethrough while confined in an elongated conduit 7, which is surrounded by hot combustion gases generated by burner or burners 8. The charge enters furnace 3 at atmospheric pressure or superatmospheric pressure as desired and in passage through furnace 3 is heated to a temperature of 200 to 350° C. more or less, preferably 250–300° C. The heated charge leaves furnace 3 through line 9 and enters trapout tray 10 in tower 5. If the charge is at superatmospheric pressure in furnace 3, partial or complete pressure reduction may occur on passage through valve 11 in line 9.

Fractionating and reaction tower 5 may take any desired form. That shown in the figure contains a plurality of disc and doughnut trays 12, but other means for promoting liquid-vapor contact such as bubble trays, Raschig rings, or similar devices may be used. The tower shown is provided with two trapout trays 10 and 13. A closed reflux coil 4 and an open reflux line 14 provide cooling, but other or additional cooling means may be used as desired. Tower 5 may also be provided with bottom heating means if desired, for example, a closed circuit reboiler (not shown) and/or an open heating coil 15 through which steam or other hot gases may be introduced into the bottom of tower 5, the amount introduced being regulated by means of valve 16.

Heavy, high boiling material overflows trapout tray 10, and this material gradually works down to lower disposed trapout tray 13. A portion of the material in trapout tray 13 is removed through line 17 and is moved by pump 18 to line 1, where it mixes with the untreated charge, the mixture passing to furnace 3. Additional material on trapout tray 13 overflows and falls to the bottom of tower 5, where it may be stripped with steam or other heated gas if desired. Bottoms from tower 5 leave through line 19 and pass through valve 20 to the middle portion of fractionating and reaction tower 21, which operates under subatmospheric pressure. Fractionating and reaction tower 21 may take any desired form. That shown in the figure contains a plurality of disc and doughnut trays 22, but other means for promoting liquid-vapor contact such as bubble trays, Raschig rings, or similar devices may be used. The tower as shown is provided with open reflux line 23, but other or additional cooling means may be used if desired. Tower 21 may also be provided with bottom heating means if desired, for example, a closed circuit reboiler (not shown) and/or an open heating coil 24 through which steam or hot gases may be introduced into the bottom of tower 21, the amount introduced being regulated by means of valve 25. The heavier portion of the material entering vacuum fractionating and reaction tower 21 gradually works downward therethrough and is removed therefrom through line 26, valve 26', and pump 27. Material in line 26 is preferably heat exchanged with charge in indirect heat exchanger 6 and is further cooled by water or the like in indirect cooler 28. The material removed as bottoms from tower 21 through line 26 represents the desired product, consisting of polymerized and/or condensed drying oil. It is highly desirable to clarify this final product by centrifuging, filtering, or similar means (not shown) to remove certain solid decomposition products that form during the processing, especially when raw linseed oil is used as charge.

Flash distillate from tower 21 passes through line 29, valve 29', indirect heat exchanger 30, indirect water cooler 31, to separator 32. Liquid may be removed from separator 32 by line 33 and moved by pump 34 to line 35. A portion of this liquid may be by-passed through line 36 and valve 37 to storage or otherwise. Another portion may be passed through valve 38 and line 23 to provide open reflux in tower 21 while the remainder may be sent through valve 39 in line 40, through indirect heat exchanger 30 and line 14 to provide open reflux in tower 5. Separator 32 is connected through line 41 to barometric condenser 47 or other similar means for maintaining a subatmospheric pressure in tower 21 and separator 32. Any water present may be withdrawn from separator 32 through line 43 and pump 44.

Overhead from tower 5 passes through line 45 and valve 46 to coolers 30 and 31 and thence to separator 32.

Preferably those parts of the apparatus shown in the figure that come in contact with the heated drying oil are constructed from or lined with such metals and alloys as copper, aluminum, Monel metal, stainless steel, or the like. Steel clad with an integrally bonded lining of stainless steel or similar non-corrosive alloy or metal provides an excellent material of construction.

In the production of lithographic varnishes by the method described and shown about 10 to 20% by volume of the fresh charge is taken overhead as vapors from the two towers and is eventually eliminated from the system through line 36 and valve 37. The exact amount of material eliminated as overhead depends largely upon the consistency of the lithographic varnish being produced.

It will be obvious that the method described and shown provides a simple, convenient, and highly advantageous process for the thermal treatment of linseed oil. In the first place, the operation is continuous, the drying oil being continuously added to the system while finished product that has been thermally treated to the desired extent is continuously withdrawn therefrom. Furthermore, temperature control is simple and exact, resulting in the production of a product of the desired and uniform properties. In addition, the thermal efficiency of the system is high, the charge being preheated simultaneously in one or more indirect heat exchangers, and additional preheat may be added to the charge at other points if desired. Furthermore, the operating cycle is much more satisfactory than those hitherto achieved in the prior art. For example, with the method and apparatus described and pictured, once the unit is on stream there are no periods devoted exclusively to bringing the charge up to reaction temperature. Similarly, there are no periods devoted exclusively to cooling the reaction products in "the yard," as is necessary in processes of the prior art. With the method and apparatus described and shown, the addition of charge, the heating of said charge to reaction temperature, the thermal treatment of the charge, cooling of the final product, and withdrawal thereof all occur simultaneously. It is also obvious that with the present method and apparatus there is no chance of contaminating the product or having the product come in contact with air while in the heated state unless this is desired. If it is desired to contact the heated material with air or dilute air, however, this may be done for example by adding the gas in controlled amounts through line 24 and valve 25 and/or line 15 and valve 16. It is obvious that the labor requirements for the improved process of this invention are at a minimum.

Another great advantage of the method forming the subject matter of the instant invention is the extreme flexibility of the whole. As has been mentioned previously, lithographic varnishes are made in many different grades, the various grades being composed of linseed oil that has been polymerized and/or condensed to various degrees. At constant temperature the extent of polymerization and/or condensation of a drying oil increases with increasing time at said constant temperature. Likewise, at constant time the extent of polymerization and/or condensation of a drying oil increases with increasing operating temperature. Accordingly, the extent of polymerization and/or condensation of a drying oil may be varied by adjusting the temperature at which the thermal treatment occurs, the time of said treatment, or both. When employing an apparatus similar to that shown in the figure, the time of thermal treatment and the temperature of said treatment may be set at any desired values within wide limits.

The temperature at which thermal treatment occurs is easily regulated by adjusting the firing rate in furnace 3. A number of methods or any combination of said methods may be employed to vary the time of said thermal treatment. It is obvious that the time of thermal treatment may be varied by changing the rate of introduction of drying oil charge to the system through line 1, other conditions being kept constant. One convenient method of varying the time of thermal treatment consists in maintaining the total throughput in furnace 3 constant at all times and varying the time of thermal treatment by changing the relative amounts of fresh drying oil charge and material from trapout tray 13 in said total furnace charge. For example, if the constant total furnace throughput is set at ten volumes in unit time, when this is made up of one part fresh drying oil and nine parts material from trapout tray 13 the time of thermal treatment is relatively long, but if, on the other hand, the total furnace charge consists of nine parts raw drying oil and one part of material from trapout tray 13 the treating time is relatively short.

Another method for changing the time and thermal treatment consists in varying the liquid level maintained in the bottom of tower 5 or the bottom of tower 21 or both. If material overflows from trapout tray 13 at a rate of one volume in unit time and the liquid maintained in the bottom of tower 5 has unit volume, the holding time will be relatively short. If, on the other hand, the liquid maintained in the bottom of tower 5 is equivalent to ten volumes, for example, the holding time therein will be relatively long. The same reasoning applies to tower 21. The method of regulating the time of thermal treating by changing the liquid level carried in the bottom of tower 5 or tower 21 or both is a most convenient one. By this method it is possible to produce a lithographic varnish of practically any desired consistency and still keep the treating temperature, fresh drying oil charging rate, and recycle oil charging rate all constant.

Time of thermal treatment may also be varied by changing the capacity of trapout tray 10 or trapout tray 13 or both. The effect is similar to that described in connection with the liquid level maintained in the bottom of towers 5 and 21. Generally, the trapout trays are fixed in size and changes are inconvenient, but if desired variable liquid level trapout trays, similar to those described in the prior art, may be used. It is evident that trapout tray 13 and more especially trapout tray 10 are not essential for the process, these being merely convenient means for accomplishing a purpose. In the absence of trapout tray 10 the charge may be added directly to a disc or doughnut in the tower. In the absence of trapout tray 13, recycle material for the furnace may be withdrawn directly from the bottom of the tower. While either or both of these trapout trays may be dispensed with, it is preferred to use both as described and shown.

The thermal treating conditions may also be varied by making certain minor changes in the apparatus. Among other modifications may be mentioned a heating zone and two towers as shown, all of the liquid products from the first tower passing to the second tower, the liquid products from the second tower passing to storage. The first tower may operate at superatmospheric or atmospheric pressure, the second at reduced pressure.

Several other methods will present themselves to those skilled in the art for regulating the time of thermal treatment, but those dealt with briefly above are sufficient to indicate the extreme flexibility of the system.

While the method forming the subject matter of the instant invention has been described with respect to the manufacture of lithographic varnishes or "stand oils," the invention is of much wider application, as will be evident to those skilled in the art. The invention may be applied, for example, to the making of oleoresinous varnishes and to the manufacture of the so-called boiled drying oils and blown drying oils. In one embodiment, suitable for use in the preparation of oleoresinous varnishes, raw linseed oil, refined linseed oil, boiled linseed oil, or a lithographic varnish may be charged through line 1, pump 2, preheating coil 4, and indirect heat exchanger 6. Following this heat exchanger the requisite amount of gum or resin or mixture thereof, which has been "run" in the required fashion, is introduced into the moving stream of preheated oil, for example, through line 49 and pump 50, the mixture then being sent to furnace 3. If desired the requisite amount of run material may be added subsequent to furnace 3; for example, the material may be added to line 9 or fractionating and reaction tower 5. The further processing is as previously explained, the temperature of treatment usually being equal to or somewhat lower than is employed in the manufacture of lithographic varnishes. The final oleoresinous varnishes are preferably clarified by any suitable means (not shown), such as filtration or centrifuging, and a drier may be added if a boiled drying oil was not used in their formulation.

The above described processes are usually applied to linseed oil, but other drying oils can be employed if desired. For example, tung oil may be polymerized and/or condensed by the process previously described, a temperature of 210° C. being used, the oil being held at temperature for 1–2 hours. Also, very satisfactory results follow on processing a mixture of tung oil and linseed oil. Other suitable drying oils or mixtures containing these may be thermally treated by procedures and equipment already pictured and described.

From the foregoing description it is clear that the liquid products eliminated from any combined fractionating and reaction tower in unit time are equal to the total charge to said tower in unit time minus the vaporous products (if any) eliminated by said tower in unit time. While on stream the combined fractionating and reaction towers contain more or less liquid, which remains essentially constant throughout a run under any given set of operating conditions, addition of charge to any tower and withdrawal of liquid products and vaporous products (if any) from the tower being at such a rate that the amount of liquid in the tower remains essentially constant, showing neither depletion nor accumulation over the whole period of the run or any portion thereof. In the appended claims the terms "withdrawing the liquid products," "withdrawing a portion of the liquid products," "withdrawing the remainder of the liquid products," and the like refer to liquid products as above defined.

Although the present invention has been described in connection with details or specific examples thereof, it is not intended that these shall be regarded as limitations upon the scope of the invention except insofar as included in the accompanying claims.

I claim:

1. In a continuous process for the thermal treatment of a siccative oil, the steps including passing said oil through a heating zone wherein said oil is brought to an elevated temperature, passing said heated oil to a primary reaction zone, withdrawing vaporous decomposition products of high volatility from said primary reaction zone through a primary fractionation zone, withdrawing liquid products from said primary reaction zone, passing said liquid products to a secondary reaction zone operating at subatmospheric pressure, withdrawing vaporous decomposition products of low volatility from said secondary reaction zone through a secondary fractionation zone, condensing a portion of said vaporous decomposition products of low volatility and passing them to the primary reaction zone and withdrawing liquid products, comprising the thermally treated product from said secondary reaction zone.

2. In a continuous process for the thermal treatment of a siccative oil, the steps including passing said oil through a heating zone wherein said oil is brought to an elevated temperature, passing said heated oil to a primary reaction zone, withdrawing vaporous decomposition products of high volatility from said primary reaction zone through a primary fractionation zone, withdrawing a portion of the liquid products from said primary reaction zone, passing said portion of the liquid products to the heating zone, withdrawing the remainder of the liquid products from said primary reaction zone, passing said remainder of the liquid products to a secondary reaction zone operating at subatmospheric pressure, withdrawing vaporous decomposition products of low volatility from said secondary reaction zone through a secondary fractionation zone, condensing a portion of said vaporous decomposition products of low volatility and passing them to the primary reaction zone and withdrawing liquid products, comprising the thermally treated product, from said secondary reaction zone.

3. In a continuous process for the thermal treatment of a siccative oil, the steps including passing said oil through a heating zone wherein said oil is brought to an elevated temperature, passing said heated oil to the upper part of a primary reaction zone, withdrawing vaporous decomposition products of high volatility from said primary reaction zone through a primary fractionation zone, withdrawing a portion of the liquid products from an intermediate point of said primary reaction zone, passing said portion of the liquid products to the heating zone, withdrawing the remainder of the liquid products from the lower part of said primary reaction zone, passing said remainder of the liquid products to a secondary reaction zone operating at subatmospheric pressure, withdrawing vaporous decomposition products of low volatility from said secondary reaction zone through a secondary fractionation zone, condensing a portion of said vaporous decomposition products of low volatility and passing them to the primary reaction zone and withdrawing liquid products, comprising the thermally treated product, from said secondary reaction zone.

ROBERT F. RUTHRUFF.